US006786227B2

(12) United States Patent
Weldon et al.

(10) Patent No.: US 6,786,227 B2
(45) Date of Patent: Sep. 7, 2004

(54) SYSTEM AND METHOD INCLUDING A FUEL TANK ISOLATION VALVE

(75) Inventors: Craig Andrew Weldon, Chatham (CA); John Edward Cook, Chatham (CA)

(73) Assignee: Siemens Automotive Inc. (CA)

( * ) Notice: Subject to any disclaimer, the term of this patent is extended or adjusted under 35 U.S.C. 154(b) by 0 days.

(21) Appl. No.: 09/931,373

(22) Filed: Aug. 17, 2001

(65) Prior Publication Data

US 2002/0088494 A1 Jul. 11, 2002

Related U.S. Application Data

(60) Provisional application No. 60/225,860, filed on Aug. 17, 2000.

(51) Int. Cl.[7] ................................................ F16K 17/18

(52) U.S. Cl. ...................... 137/14; 137/493.7; 137/510; 123/518

(58) Field of Search ............................. 137/493.7, 510; 123/518, 519, 520

(56) References Cited

U.S. PATENT DOCUMENTS 3,933,171 A * 1/1976 Hay ........................ 137/493.7
4,483,369 A 11/1984 Akagi et al. ........... 137/625.12
5,390,703 A 2/1995 Tengesdal ................... 137/629
5,474,048 A * 12/1995 Yamazaki et al. .......... 123/519
5,584,278 A * 12/1996 Satoh et al. ................ 123/516
5,629,660 A 5/1997 Kenyon et al. ............. 335/227
6,021,997 A 2/2000 Hell ........................ 251/30.04
6,164,312 A * 12/2000 Bostedo et al. ............. 137/510

OTHER PUBLICATIONS

U.S. patent application No. 09/960,732, Craig Weldon et al., filed Sep. 24, 2001.

U.S. patent application No. 09/960,718, Craig Weldon et al., filed Sep. 24, 2001.

* cited by examiner

*Primary Examiner*—Stephen M. Hepperle

(57) ABSTRACT

A valve, system, and method for controlling evaporative emissions of a volatile fuel. The system includes a fuel vapor collection canister, an isolation valve, and a fuel tank. The isolation valve includes a housing defining a chamber, a diaphragm movable with respect to the housing between a first configuration and a second configuration, and a coil spring biasing the diaphragm toward the first configuration. The housing includes an interior partition that defines an aperture and separates the housing into first and second sections, a first port that is in fuel vapor communication with the fuel vapor collection canister, and a second port. In the first configuration, the diaphragm occludes the aperture, divides the chamber into three sub-chambers, and substantially prevents fuel vapor flow between the first and second ports. In the second configuration, the diaphragm divides the chamber into two sub-chambers and permits generally unrestricted fuel vapor flow between the first and second ports. The coil spring includes a first end that engages the housing and a second end that engages the diaphragm. The fuel tank is in fuel vapor communication with the second port of the isolation valve. The fuel tank isolation valve can also include a check valve that equalizes pressure between the first and second ports to relieve excess vacuum in the fuel tank.

22 Claims, 3 Drawing Sheets

SYSTEM AND METHOD INCLUDING A FUEL TANK ISOLATION VALVE

CLAIM FOR PRIORITY

This application claims the benefit of the earlier filing date of U.S. Provisional Application 60/225,860, filed Aug. 17, 2000, which is incorporated herein in its entirety by reference.

FIELD OF THE INVENTION

This disclosure generally relates to a fuel tank isolation control valve. In particular, this disclosure is directed to an evaporative emission control system including a fuel tank isolation control valve to control the flow of fuel vapor from a fuel tank of a vehicle.

BACKGROUND OF THE INVENTION

It is believed that prior to legislation requiring vehicles to store hydrocarbon vapors that are generated when refueling a vehicle, a simple orifice structure was used to maintain a positive pressure in a fuel tank to retard vapor generation. It is believed that such orifice structures could no longer be used with the advent of requirements controlling onboard refueling. It is believed that, on some vehicles, the orifice structure was simply deleted, and on other vehicles, the orifice structure was replaced with a diaphragm-actuated pressure relief valve.

It is believed that it is necessary on some vehicles to maintain an elevated pressure in the fuel tank to suppress the rate of fuel vapor generation and to minimize hydrocarbon emissions to the atmosphere. It is believed that under hot ambient temperature conditions or when the fuel is agitated, e.g., when a vehicle is operated on a bumpy road, the amount of fuel vapor generated can exceed the amount of fuel vapor that can be purged by the engine. It is believed that a purge canister can become hydrocarbon saturated if these conditions occur and are maintained for an extended period. It is believed that such a hydrocarbon saturated purge canister is unable to absorb the additional fuel vapors that occur during vehicle refueling, and that hydrocarbon vapors are released into the atmosphere.

It is believed that there is a need to provide a valve that that overcomes the drawbacks of orifice structures and diaphragm-actuated pressure relief valves.

SUMMARY OF THE INVENTION

The present invention provides a system for controlling evaporative emissions of a volatile fuel. The system includes a fuel vapor collection canister, an isolation valve, and a fuel tank. The isolation valve includes a housing defining a chamber, a diaphragm movable with respect to the housing between a first configuration and a second configuration, and a coil spring biasing the diaphragm toward the first configuration. The housing includes an interior partition that defines an aperture and separates the housing into first and second sections, a first port that is in fuel vapor communication with the fuel vapor collection canister, and a second port. In the first configuration, the diaphragm occludes the aperture, divides the chamber into three sub-chambers, and substantially prevents fuel vapor flow between the first and second ports. In the second configuration, the diaphragm divides the chamber into two sub-chambers and permits generally unrestricted fuel vapor flow between the first and second ports. The coil spring includes a first end that engages the housing and a second end that engages the diaphragm. The fuel tank is in fuel vapor communication with the second port of the isolation valve.

The present invention also provides a fuel tank isolation valve. The fuel tank isolation valve includes a housing defining a chamber, a diaphragm movable with respect to the housing, and a resilient element. The housing includes a first port and a second port. And the resilient element biases the diaphragm toward a first configuration that divides the chamber into three sub-chambers and substantially prevents fluid flow between the first and second ports.

The present invention also provides a method of controlling fuel vapor flow between an evaporative emission space of a fuel tank and a fuel vapor collection canister. The method includes providing a fuel tank isolation valve, moving the diaphragm to a first configuration in response to a second pressure level at a second port, and moving the diaphragm to a second configuration in response to a first pressure level at a first port. The fuel tank isolation valve includes a housing defining a chamber, a diaphragm movable with respect to the housing between the first configuration and the second configuration, and a resilient element biasing the diaphragm toward the first configuration. The housing includes a first port that is adapted for fuel vapor communication with the evaporative emission space of the fuel tank and includes a second port that is adapted for fuel vapor communication with the fuel vapor collection canister. The first configuration divides the chamber into three sub-chambers and substantially prevents fluid flow between the first and second ports. The second configuration divides the chamber into two sub-chambers and permits generally unrestricted fluid flow between the first and second ports. The first pressure level is above atmospheric pressure, and the second pressure level is below atmospheric pressure.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

As it is used herein, the term "fluid" can refer to a gaseous phase, a liquid phase, or a mixture of the gaseous and liquid phases. The term "fluid" preferably refers to the gaseous phase of a volatile liquid fuel, e.g., a fuel vapor. The term "peripheral" preferably refers to a portion of a body that is proximate an edge of the body, and the term "central" preferably refers to a portion of a body that is inboard of the edge portion. The term "central" is not limited to the geometric center of the body.

Figure 1:
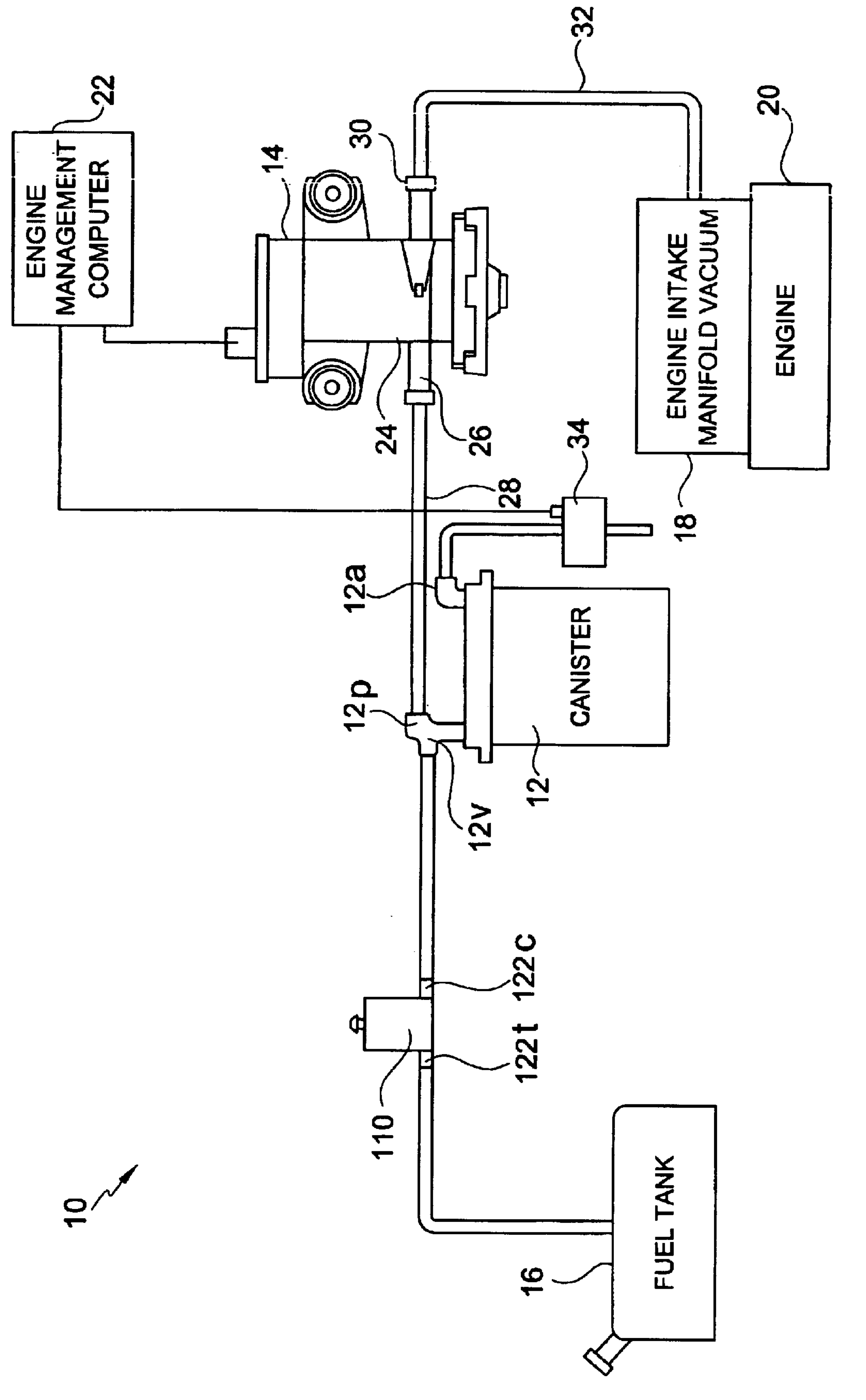
FIG. 1 is a schematic illustration of an evaporative emission control system including a fuel tank isolation valve.

Referring initially to FIG. 1, an evaporative emission control system 10, e.g., for a motor vehicle, includes a fuel vapor collection canister 12, e.g., a carbon or charcoal canister, and a canister purge solenoid valve 14 connected between a fuel tank 16 and an intake manifold 18 of an internal combustion engine 20. An engine control management computer 22 supplies a purge valve control signal for operating the canister purge solenoid valve 14.

Canister purge solenoid valve 14 preferably includes a housing 24 having an inlet port 26 and an outlet port 30. The inlet port 26 is in fluid communication, via a conduit 28, with a purge port 12*p* of the fuel vapor collection canister 12. The outlet port 30 is in fluid communication, via a conduit 32, with intake manifold 18. An operating mechanism is disposed within the housing 24 for opening and closing an internal passage that provides fluid communication between the inlet port 26 and the outlet port 30. The mechanism includes a spring that biases a valve element to a normally closed arrangement, i.e., so as to occlude the internal passage between the inlet port 26 and the outlet port 30. When the operating mechanism, e.g., a solenoid, is energized by a purge valve control signal from the engine control management computer 22, an armature opposes the spring to open the internal passage so that flow can occur between the inlet port 26 and the outlet port 30.

According to a preferred embodiment, an ambient vent valve 34 is in fuel vapor communication between the ambient port 12*a* of canister 12 and the ambient environment. A filter (not shown) can be interposed between the ambient vent valve 34 and the ambient environment. The ambient vent valve 34 is normally open, i.e., so as to permit unrestricted fluid communication with the ambient environment, until the engine control management computer 22 supplies an ambient vent valve control signal that closes the ambient vent valve 34. Preferably, the ambient vent valve 34 is normally open to facilitate charging and discharging of the canister 12, and can be closed to facilitate leak testing of the evaporative emission control system 10.

The canister purge solenoid valve 14 can be used to purge free hydrocarbons that have been collected in the fuel vapor collection canister 12. The free hydrocarbons that are purged from the fuel vapor collection canister 12 are combusted by the internal combustion engine 20.

A fuel tank isolation valve 110 is connected in series between a vapor dome or headspace, i.e., the gaseous portion within the fuel tank 16, and a valve port 12*v* of the fuel vapor collection canister 12.

A vapor dome pressure level that is approximately 1 inch of water above atmospheric pressure has been determined to suppress fuel vapor generation in the fuel tank 16. Higher pressures, e.g., as much as 10 inches water above atmospheric pressure, can also suppress fuel vapor generation.

Figure 2:
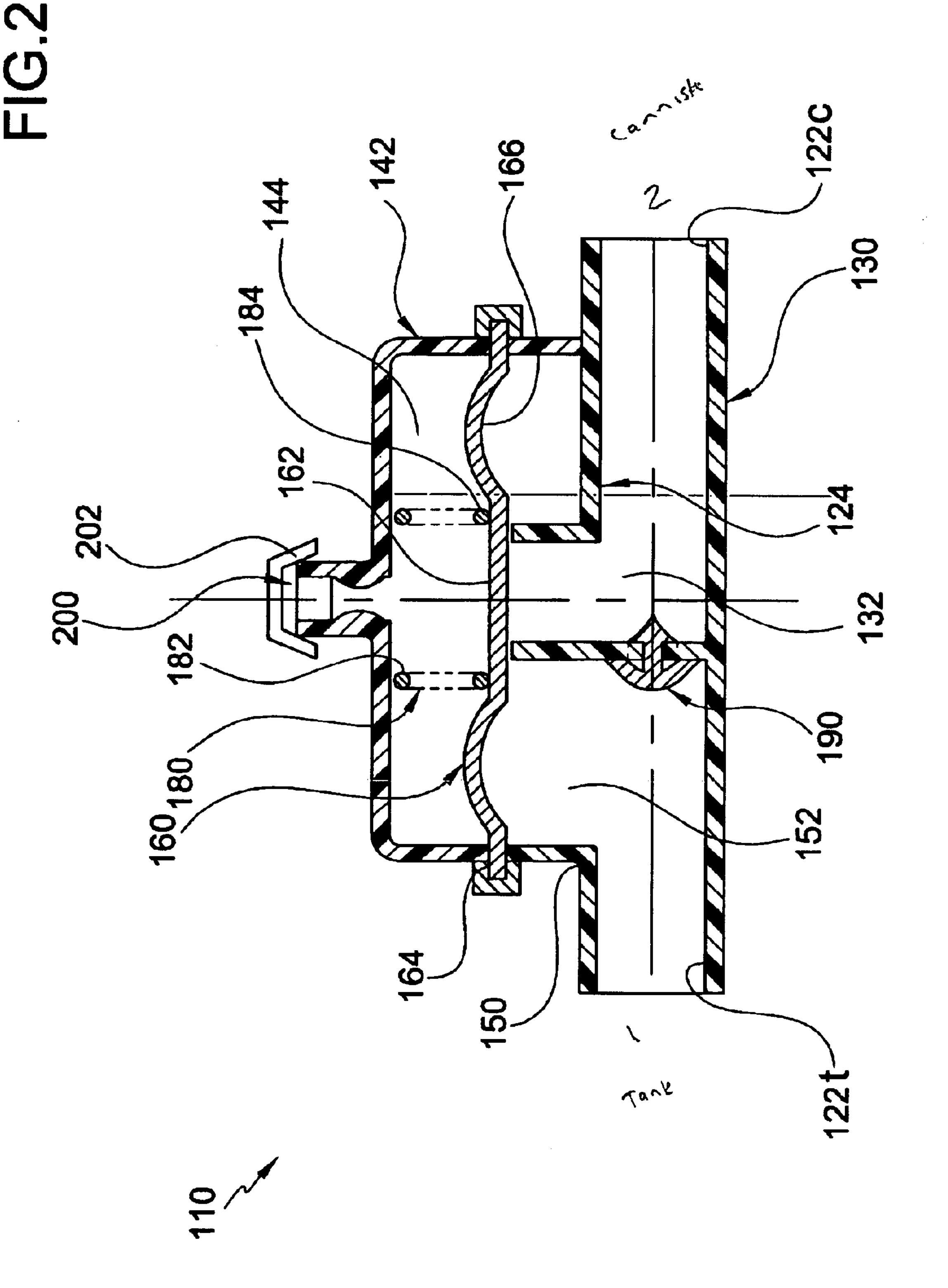
FIG. 2 is a sectional view of an embodiment of a non-electrical fuel tank isolation valve.
Figure 3:
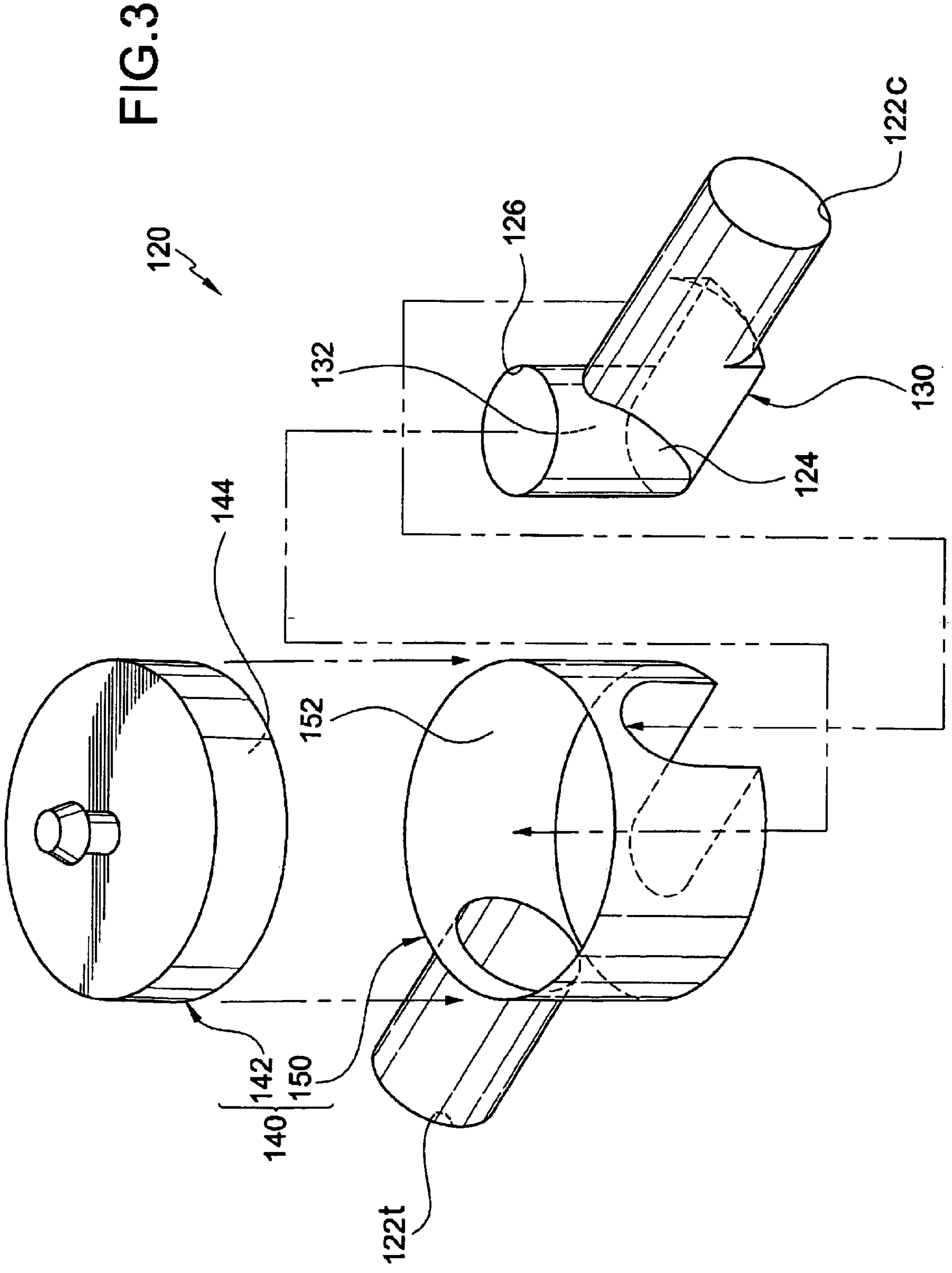
FIG. 3 is an exploded perspective view of a housing for the fuel tank isolation valve shown in FIG. 2.

Referring additionally to FIGS. 2 and 3, the fuel tank isolation valve 110 includes a housing 120, a diaphragm 160, and a resilient element 180. The housing 120 defines within its exterior walls a chamber. The housing 120 includes an inlet port 122*t* for ingress into the chamber of fuel vapor from an evaporative emission space of the fuel tank 16, and includes an outlet port 122*c* for egress of fuel vapor from the chamber to the fuel vapor collection canister 12. Fuel vapor is communicated within the housing 120 between the inlet port 122*t,* which is at an inlet pressure level, and the outlet port 122*c,* which is at an outlet pressure level. Typically, the inlet pressure level is greater than ambient pressure, while the outlet pressure level is equal to or less than ambient pressure.

The housing 120 also includes an interior partition 124 that defines an aperture 126 and conceptually separates the housing 120 into an outlet section 130 and an inlet section 140. The diaphragm 160 divides the inlet section 140 of the housing 120 into a cover segment 142 and a body segment 150. Thus, the chamber defined by the housing 120 may be considered to be composed of three sub-chambers. A first sub-chamber 132 extends from the aperture 126 to the outlet port 122*c,* and is defined by the interior partition 124, the diaphragm 160, and the outlet section 130 of the housing 120. A second sub-chamber 152 extends from the inlet port 122*t* to the aperture 126, and is defined by the interior partition 124, the diaphragm 160, and the body segment 150 of the inlet section 140 of the housing 120. A third sub-chamber 144 encloses the resilient element 180, and is defined by the diaphragm 160 and the cover segment 142 of the inlet section 140 of the housing 120.

The diaphragm 160 is movable, e.g., flexible, with respect to the housing 120 between a first configuration (not shown) and a second configuration (shown in FIG. 2). At the first configuration, the diaphragm 160 occludes the aperture 126, divides the chamber into the three sub-chambers, and substantially prevents fuel vapor flow between the inlet port 122*t* and the outlet port 122*c*. At the second configuration, the diaphragm 160 divides the chamber into only two sub-chambers, i.e., the first and second sub-chambers 132, 152 are joined in fluid communication, and permits generally unrestricted fuel vapor flow between the inlet port 122*t* and the outlet port 122*c*.

The diaphragm 160 can include a central portion 162, a peripheral portion 164, and an intermediate portion 166 that extends between the central and peripheral portions 162, 164. The central portion 162 is operatively engaged, e.g., biased, by the resilient element 180. The peripheral portion 164 is fixed with respect to the housing 120, e.g., sandwiched between the body and cover segments 150, 142 of the inlet section 140 of the housing 120. The intermediate portion 166 includes a relatively flexible material as compared to the central portion 162. Preferably, the central portion 162 of the diaphragm 160 includes a rigid plate, i.e., sufficiently rigid to avoid appreciable deformation as a result of a pressure differential between the inlet and outlet sections 140, 130 when the diaphragm is at the first configuration. The intermediate portion 166 can include a convolute, which may be formed either in a convex shape with respect to the third sub-chamber 144 (as shown in FIG. 2) or in a concave shape with respect to the third sub-chamber 144 (not shown).

The diaphragm 160 can be integrally formed, e.g., molded, as a homogenous material, with the central portion 162 having a thicker cross-section than the intermediate portion 166. Preferably, the homogenous material is impermeable to hydrocarbon migration.

The resilient element 180, which can be a coil spring, can have a first end 182 engaging the cover segment 142 of the inlet section 140 of the housing 120, and can have a second end 184 engaging the central portion 162 of the diaphragm 160. The resilient element 180 biases the diaphragm 160 toward the first configuration, i.e., such that the central portion 162 of the diaphragm 160 occludes the aperture 126.

A check valve 190 can be provided in the interior partition 124. The check valve 190 enables unidirectional fluid communication between the first and second sub-chambers 132, 152. For example, the check valve 190 can act as a safety device to relieve excess vacuum in the fuel tank 16.

A flow restrictor 200 can be provided in the cover segment 142 of the second section 140 of the housing 120. The flow restrictor 200 can regulate fluid communication between the third sub-chamber 144 and ambient conditions exterior to the housing 120. For example, the flow restrictor 200 can compensate the third sub-chamber 144 for changes in barometric pressure, and can damp the response of the diaphragm 160. Preferably, the flow restrictor 200 includes at least one of an orifice and a filter. The flow restrictor 200 can be arranged under a hood 202 that prevents the ingress of water, etc. into the third sub-chamber 144.

A method of controlling fuel vapor flow between the evaporative emission space of the fuel tank 16 and the fuel vapor collection canister 12 will now be described. Using the fuel tank isolation valve 110, moving toward or positioning the diaphragm 160 at the first configuration is enhanced by a pressure level below atmospheric pressure at the outlet port 122*c*, and the diaphragm 160 is moved to the second configuration in response to a first pressure level above atmospheric pressure at the inlet port 122*t*. The biasing force of the resilient element 180 is selected such that the first pressure level suppresses fuel vapor generation in the fuel tank 16. Preferably, the first pressure level is approximately one inch of water above atmospheric pressure.

In response to a third pressure level below atmospheric pressure at the inlet port 122*t*, the check valve 190 can equalize pressure between the inlet and outlet ports 122*t*, 122*c*, e.g., to relieve excess vacuum in the fuel tank 16. Preferably, the third pressure level is approximately six inches of water below atmospheric pressure Movement of the diaphragm 160 can also be damped by the flow restrictor 200. For example, movement of the diaphragm 160 can be damped in response to rapid increases in barometric pressure or rapid increases in the first pressure level such as may be caused by sloshing of liquid fuel in the fuel tank 16.

The evaporative emission control system, the fuel tank isolation valve, and the method that are described above provide numerous advantages. These advantages include mechanical operation (i.e., no electrical operation), eliminating a wiring connection to the engine control management computer 22, relieving excess naturally occurring vacuum as fuel in the fuel tank 16 cools, and facilitating refueling of the fuel tank 16 while the engine 20 is operating. Further, isolating the fuel tank 16 from the rest of the evaporative emission control system 10 prevents purge vacuum from entering the fuel tank 16, reduces hydrocarbon spikes during aggressive purging, minimizes engine falter due to hydrocarbon spikes, and maximizes purge capability of the fuel vapor collection canister 12, which aids in reducing hydrocarbons stores in the fuel vapor collection canister 12. Moreover, damping movement of the diaphragm 160 can provide controlled hydrocarbon venting and also suppress undesirable pressure spikes.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A system for controlling evaporative emissions of a volatile fuel, the system comprising:

a fuel vapor collection canister;

an isolation valve including:

a housing defining a chamber, the housing including an interior partition, a first port, and a second port, the interior partition defining aperture and separating the housing into first and second sections, and the first port being in fuel vapor communication with the fuel vapor collection canister;

a diaphragm dividing the second section of the housing into first and second segments, the diaphragm including a central portion, a peripheral portion being fixed with respect to tho housing, and intermediate portion extending between the central and peripheral portions, the diaphragm being movable with respect to the housing between a first configuration and a second configuration, the first configuration occluding the aperture to as to substantially prevent fuel vapor flow between the first and second ports and dividing the chamber into three sub-chambers including:

a first sub-chamber extending from the first port to the aperture and being defined by the interior partition, the central portion of the diaphragm, and the first section of the housing;

a second sub-chamber extending from the aperture to the second port and being defined by the interior partition, the intermediate portion of the diaphragm, and the second segment of the second section of the housing; and a third sub-chamber being defined by the first segment of the second section of the housing and the central and intermediate portions of the diaphragm; and the second configuration dividing the chamber into two sub-chambers and permitting generally unrestricted fuel vapor flow between the first and second ports; and a coil spring being enclosed by the third sub-chamber and biasing the diaphragm toward the first configuration, the coil spring including a first end engaging the housing and a second and engaging the central portion of the diaphragm; and a fuel tank being in fuel vapor communication with the second port of the isolation valve.

2. The system according to claim 1, wherein the intermediate portion of the diaphragm comprises a flexible material relative to the central portion.

3. A fuel tank isolation valve consisting essentially of:

a housing defining a chamber, the housing including a first port adapted to be connected in fluid communication with a fuel vapor collection canister, a second port adapted to be connected in fluid communication with a fuel tank, and an interior partition defining an aperture, the interior partition separating the housing into first and second sections;

a diaphragm movable with respect to the housing, the diaphragm dividing the second section of the housing into first and second segments; and a resilient element biasing the diaphragm toward a first configuration dividing the chamber into three sub-chambers and substantially preventing fluid flow between the first and second ports;

wherein the chamber at the first configuration comprises a first sub-chamber, a second sub-chamber, and a third sub-chamber, the first sub-chamber extending from the first port to the aperture and being defined by the interior partition, the diaphragm, and the first section of the housing, the second sub-chamber extending from the aperture to the second and being defined by the interior partition, the diaphragm, and the second segment of the second section of the housing, and the third sub chamber enclosing the resilient element and being defined by the diaphragm and the first segment of the second section of the housing.

4. A fuel tank isolation valve comprising:

a housing defining a chamber, the housing including a first port adapted to be connected in fluid communication with a fuel vapor collection canister, a second port adapted to be connected in fluid communication with a fuel tank, and an interior partition defining an aperture, the interior partition separating the housing into first and second sections, and the interior partition including a check valve providing unidirectional fluid communication from the first sub-chamber to the second sub-chamber;

a diaphragm movable with respect to the housing, the diaphragm dividing the second section of the housing into first and second segments; and a resilient element biasing the diaphragm toward a first configuration dividing the chamber into three sub-chambers and substantially preventing fluid flow between the first and second ports:

wherein the chamber at the first configuration comprises a first sub-chamber, a second sub-chamber, and a third sub-chamber, the first sub-chamber extending from the first port to the aperture and being defined by the interior partition, the diaphragm, and the first section of the housing, the second sub-chamber extending from the aperture to the second port and being defined by the interior partition, the diaphragm, and the second segment of the second section of the housing, and the third sub chamber enclosing the resilient element and being defined by the diaphragm and the first segment of the second section of the housing.

5. The fuel tank isolation valve according to claim 4, wherein the diaphragm is movable to a second configuration dividing the chamber into two sub-chambers and permitting generally unrestricted fluid flow between the first and second ports.

6. The fuel tank isolation valve according to claim 4, wherein the resilient element comprises a first end engaging the housing and a second end engaging the diaphragm.

7. The fuel tank isolation valve according to claim 6, wherein the diaphragm comprises a central portion, a peripheral portion, and an intermediate portion extending between the central and peripheral portions, the central portion engaging the second end of the resilient element, the peripheral portion being fixed with respect to the housing, and the intermediate portion including a flexible material relative to the central portion.

8. The fuel tank isolation valve according to claim 7, wherein the central portion of the diaphragm comprises a rigid plate.

9. The fuel tank isolation valve according to claim 7, wherein the intermediate portion comprises a convolute.

10. The fuel tank isolation valve according to claim 7, wherein the diaphragm comprises a homogenous material.

11. The fuel tank isolation valve according to claim 10, wherein the homogenous material comprises a hydrocarbon impermeable material.

12. The fuel tank isolation valve according to claim 10, wherein the central portion comprises a thicker cross-section relative to the intermediate portion.

13. The fuel tank isolation valve according to claim 4, wherein the resilient element comprises a coil spring.

14. The fuel tank isolation valve according to claim 4, wherein the diaphragm occludes the aperture at the first configuration.

15. The valve according to claim 4, wherein the first segment of the second section of the housing comprises a flow restrictor regulating fluid communication between the third sub-chamber and ambient conditions exterior to the housing.

16. The valve according to claim 15, wherein the flow restrictor comprises an orifice.

17. The valve according to claim 15, wherein the flow restrictor comprises a filter.

18. A method of controlling fuel vapor flow between an evaporative emission space of a fuel tank and a fuel vapor collection canister, the method comprising:

providing a fuel tank isolation valve consisting essentially of:

a housing defining a chamber, the housing including a first port being adapted for the fuel vapor communication with the evaporative emission space of the fuel tank and including a second port being adapted for fuel vapor communication with the fuel vapor collection canister;

a diaphragm including a central portion, a peripheral portion being fixed with respect to the housing, and an intermediate portion extending between the central and peripheral portions, the diaphragm movable with respect to the housing between a first configuration and a second configuration, the first configuration dividing the chamber into three sub-chambers and substantially preventing fluid flow between the first and second ports, and the second configuration dividing the chamber into two sub-chambers and permitting generally unrestricted fluid flow between the first and second ports; and a resilient element biasing the diaphragm toward the first configuration;

moving the diaphragm to the first configuration in response to a second pressure level at the second port acting on the central portion of the diaphragm, the second pressure level being below atmospheric pressure; and moving the diaphragm to the second configuration in response to a first pressure level at the first port acting on the intermediate portion of the diaphragm, the first pressure level being above atmospheric pressure.

19. The method of controlling fuel vapor flow between an evaporative emission space of a fuel tank and a fuel vapor collection canister, the method comprising:

providing a fuel tank isolation valve including:

a housing defining a chamber, the housing including a first port being adapted for fuel vapor communication with the evaporative emission space of the fuel tank and including a second port being adapted for fuel vapor communication with the fuel vapor collection canister;

a diaphragm including a central portion, a peripheral portion being fixed with respect to the housing, and an intermediate portion extending between the central and peripheral portions, the diaphragm movable with respect to the housing between a first configuration and a second configuration, the first configuration dividing the chamber into three sub-chambers and substantially preventing fluid flow between the first and second ports, and the second configuration dividing the chamber into two sub-chambers and permitting generally unrestricted fluid flow between the first and second ports, and a resilient element biasing the diaphragm toward the first configuration:

moving the diaphragm to the first configuration in response to a second pressure level at the second port acting on the central portion of the diaphragm, the second pressure level being below atmospheric pressure;

moving the diaphragm to the second configuration in response to a first pressure level at the first port acting on the intermediate portion of the diaphragm, the first pressure level being above atmospheric pressure; and equalizing pressure at the first and second ports in response to a third pressure level at the first port, the third pressure level being below atmospheric pressure.

20. The method according to claim 19, wherein the equalizing comprises providing a check valve.

21. A method of controlling fuel vapor flow between an evaporative emission space of a fuel tank and a fuel vapor collection canister, the method comprising:

providing a fuel tank isolation valve including:

a housing defining a chamber, the housing including a first port being adapted for fuel vapor communication with the evaporative emission space of the fuel tank and including a second port being adapted for fuel vapor communication with the fuel vapor collection canister;

a diaphragm movable with respect to the housing between a first configuration and a second configuration, the first configuration dividing the chamber into three sub-chambers and substantially preventing fluid flow between the first and second ports, and the second configuration dividing the chamber into two sub-chambers and permitting generally unrestricted fluid flow between the first and second ports; and a resilient element biasing the diaphragm toward the first configuration;

moving the diaphragm to the first configuration in response to a second pressure level at the second port, the second pressure level being below atmospheric pressure;

moving the diaphragm to the second configuration in response to a first pressure level at the first port, the first pressure level being above atmospheric pressure; and equalizing pressure at the first and second ports in response to a third pressure level at the first port, the third pressure level being below atmospheric pressure wherein the first pressure level is at least one inch of water above atmospheric pressure, and the third pressure level is at least six inches of water below atmospheric pressure.

22. A method of controlling fuel vapor flow between an evaporative emission space of a fuel tank and a fuel vapor collection canister, the method comprising:

providing a fuel tank isolation valve including:

a housing defining a chamber, the housing including a first port being adapted for fuel vapor communication with the evaporative emission space of the fuel tank and including a second port being adapted for fuel vapor communication with the fuel vapor collection canister;

a diaphragm including a central portion, a peripheral portion being fixed with respect to the housing, and an intermediate portion extending between the central and peripheral portions, the diaphragm movable with respect to the housing between a first configuration and a second configuration, the first configuration dividing the chamber into three sub-chambers and substantially preventing fluid flow between the first and second ports, and the second configuration dividing the chamber into damping and fuel vapor flow, sub-chambers and permitting generally unrestricted fluid flow between the first and second ports; and a resilient element biasing the diaphragm toward the first configuration;

moving the diaphragm to the first configuration in response to a second pressure level at the second port acting on the central portion of the diaphragm, the second pressure level being below atmospheric pressure;

moving the diaphragm to the second configuration in response to a first pressure level at the first port acting on the intermediate portion of the diaphragm, the first pressure level being above atmospheric pressure; and damping the moving of the diaphragm, the damping being in response to rapid increases in the first pressure level and providing a flow restrictor regulating fluid communication between the damping sub-chamber and ambient conditions exterior to the housing.

* * * * *